Nov. 19, 1935.  H. A. HANSEN  2,021,416
BOTTLE LIFTER
Filed July 13, 1935
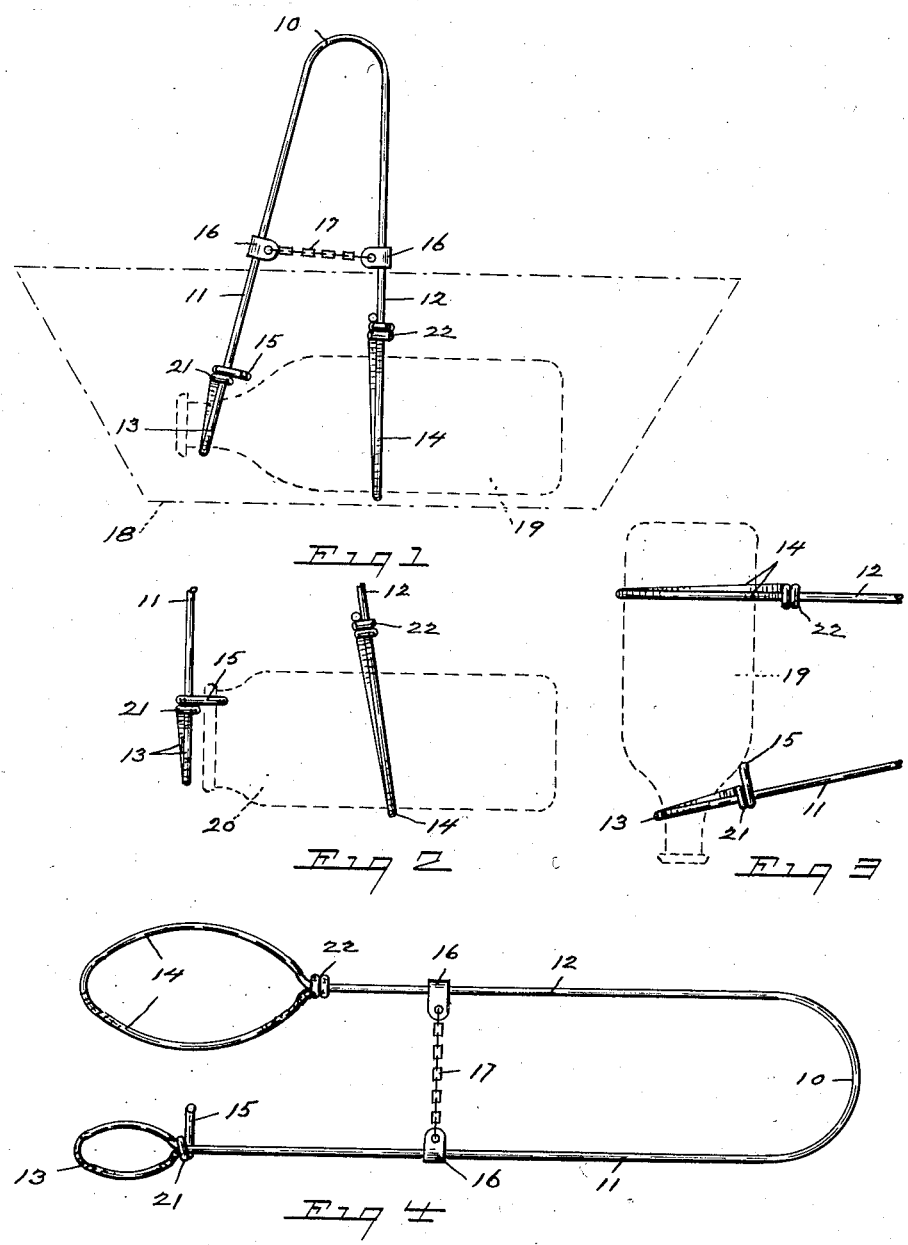
Inventor
Herbert A. Hansen
By John J. Thompson
Attorney Patented Nov. 19, 1935

2,021,416

UNITED STATES PATENT OFFICE 2,021,416

BOTTLE LIFTER

Herbert A. Hansen, Poughkeepsie, N. Y.

Application July 13, 1935, Serial No. 31,169

2 Claims. (Cl. 294—33)

This invention relates primarily to a lifter or handling device for bottles, jars and the like, and more particularly to an implement for lifting and removing nursing bottles from a hot sterilizing bath.

In the washing and sterilizing of bottles and jars and nipples, it is found very hard to remove them from the boiling water and drain them without the use of some implement by which the bottle may be gripped and raised out of the bath and turned into different positions for draining.

The object of the invention is to provide a utensil of this kind that will readily grasp either a small-neck bottle, a large-open-neck bottle, fruit jar or nursing-bottle nipple.

Another object of the invention is to provide a device of this kind which can be readily placed over the bottle or jar.

Another object of the invention is to provide a device in which the spread of the gripping arms can be controlled and adjusted.

Another object of the invention is to provide a simple, durable and efficient device which may be readily cleaned and which is composed of few parts and none of which are loose.

Another object of the invention is to provide means whereby the bottle or jar may be readily removed from the boiling water without danger to the person manipulating it.

With these and other objects in view, my invention consists in certain novel construction and combination of parts as will hereinafter be fully described and claimed and further illustrated in the accompanying drawing which forms a part hereof and in which like figures of reference refer to corresponding parts in all of the views, and it is understood that slight changes may be made without departing from the spirit of the invention.

In the drawing:

Figure 1 shows the device as applied to the usual small-necked nursing bottle, within a sterilizing pan, which is indicated by the broken lines.

Figure 2 shows the utensil as applied to a large-mouth bottle or jar.

Figure 3 shows how the utensil may be employed for inverting the bottle to allow it to drain.

Figure 4 shows a perspective view of the device, in which the gripping arms are in parallel relation with each other when in a normal position.

Referring to the drawing:

The device is constructed from a single piece of resilient wire or other suitable material, and comprises a U-shaped handle having the return bend 10, and the gripping arms 11 and 12 which are slightly diverging from each other as shown in Figures 1, 2 and 3, but which may be parallel as shown in Figure 4.

The arm 11 terminates in a closed ring 13 of the proper dimension to readily slip over the neck of the usual small-neck nursing bottle 19; the ring 13 being formed by twisting the end of the wire 11 about itself as at 21, but leaving the free end 15 projecting at right angles thereto to form a spur 15.

The arm 12 also terminates in a closed ring 14 formed by twisting the end of the wire 12 about itself as at 22, but in this case, the ring 14 is of greater diameter than the ring 13 and can be easily passed over the body of the bottle or jar, and the two rings 13 and 14 are eccentric with each other.

As the utensil is constructed from resilient material the arms 11 and 12 have a natural tendency to spread apart, and to control this and also to limit this spreading movement, which might allow the large ring 14 to slip off of the end of the bottle body, I have provided each of the arms 11 and 12 with the sliding lugs 16 which are frictionally mounted thereon.

These lugs 16 are connected together by a chain 17 or other suitable means, or some suitable form of hook or other limiting device may be employed.

As shown in Figures 1, 2 and 3, by moving these lugs 16 towards the end 10 the spread of the arms will be increased and by moving them towards the rings, the spread of the arms will be decreased, as the normal position of the arms 11 and 12 is parallel; but as shown in Figure 4, these lugs 16 and chain 17 are employed only to limit the spread and the spread can not be adjusted.

In the use of the utensil, it is grasped in the hand, the arms compressed together and the large ring 14 slipped over the neck of the bottle and moved down upon the body of the bottle to bring the small ring 13 over the neck. The arms 11 and 12 are then allowed to spread apart which will bring the rings 13 and 14 into a gripping position with the bottle as shown in Figures 1 and 3 of the drawing, exerting a firm grip by which the bottle may be lifted from the bath, and inverted as shown in Figure 3, to drain.

In the case of a large open-mouth bottle or jar as shown in Figure 2, the large ring 14 is placed over the body of the bottle 20 and the spur 15 of the small ring 13 is inserted into the mouth of the bottle 20; the arm 11 acting as a stop against the end of the mouth, and in this case the bottle 20 is lifted by the ring 14 and the spur 15.

In a similar manner the spur 15 may be inserted into a nipple or other object to remove it from the bath, or a nipple may be grasped between the aligned ends of the rings 13 and 14 in a similar manner to pliers; said rings 13 and 14 being formed eccentric to each other so that their outer edges register with each other and form a pair of lips by which objects may be gripped.

Having thus described my invention, what I claim as new and desire to secure by Letters Patent, is:

1. As an article of manufacture, a bottle lifter comprising a U-shaped handle of resilient material, arms formed thereon and diverging therefrom, closed rings formed on the ends of said arms in eccentric relation with each other, one of said rings of smaller diameter than the other and formed with a projecting spur, means for limiting the spread of said arms, comprising a pair of slides mounted on said arms, and a flexible connection between said slides.

2. As an article of manufacture, a bottle and jar lifter comprising a U-shaped handle, a pair of arms integral therewith and extending therefrom in spaced relation with each other, closed rings of different diameters formed on said arms in eccentric relation with each other, a spur formed on one of said rings for insertion into the article to be lifted, a pair of lugs slidably mounted on said arms and adapted to be moved thereon, and a flexible connection secured to said lugs for controlling the spread of said arms and governed by the position of the lugs upon said arms.

HERBERT A. HANSEN.